(12) United States Patent
Higashiyama et al.

(10) Patent No.: US 8,427,572 B2
(45) Date of Patent: Apr. 23, 2013

(54) CAMERA HEAD AND CAMERA DEVICE

(75) Inventors: Seiji Higashiyama, Fukuoka (JP); Yuki Yoshikuni, Fukuoka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/405,930

(22) Filed: Feb. 27, 2012

(65) Prior Publication Data

US 2012/0218466 A1    Aug. 30, 2012

(30) Foreign Application Priority Data

Feb. 28, 2011   (JP) ................................ 2011-041479
Feb. 28, 2011   (JP) ................................ 2011-041483

(51) Int. Cl.
*H04N 5/225*    (2006.01)

(52) U.S. Cl.
USPC .............................. 348/340; 348/375; 348/65

(58) Field of Classification Search ............ 348/340, 348/211.14, 65, 92
See application file for complete search history.

(56) References Cited

U.S. PATENT DOCUMENTS

| | | | |
|---|---|---|---|
| 5,332,031 A | | 7/1994 | Kiga |
| 5,940,126 A | * | 8/1999 | Kimura .......................... 348/294 |
| 6,956,610 B1 | * | 10/2005 | Walls ............................ 348/340 |
| 7,126,101 B2 | * | 10/2006 | Yamaguchi ................ 250/208.1 |
| 2006/0092318 A1 | | 5/2006 | Frith |
| 2008/0231723 A1 | | 9/2008 | Yonemitsu et al. |
| 2009/0073303 A1 | | 3/2009 | Ogasawara et al. |
| 2009/0086417 A1 | | 4/2009 | Hasegawa |
| 2009/0251569 A1 | * | 10/2009 | Nonaka ...................... 348/240.1 |

FOREIGN PATENT DOCUMENTS

| | | |
|---|---|---|
| EP | 0565366 | 10/1993 |
| JP | 2002-72341 | 3/2002 |
| JP | 2002-354300 | 12/2002 |

OTHER PUBLICATIONS

Search report from E.P.O., mail date is May 22, 2012.

* cited by examiner

*Primary Examiner* — Tuan Ho
*Assistant Examiner* — Zhenzhen Wu
(74) *Attorney, Agent, or Firm* — Greenblum & Bernstein, P.L.C.

(57) ABSTRACT

Provided is a camera head capable of further size reduction. A camera head of a camera device is provided with an imaging unit having three image sensors, a flexible substrate connected to the three image sensors, and a chassis in which the imaging unit is accommodated and on which the flexible substrate is mounted. The three image sensors are provided on the upper face side, the rear face side, and the lower face side of the imaging unit, respectively, and the flexible substrate is arranged on the transverse face side of the imaging unit on which the image sensors are not provided in the chassis.

5 Claims, 13 Drawing Sheets

CAMERA HEAD AND CAMERA DEVICE

BACKGROUND OF THE INVENTION

1. Field of the Invention

The present invention relates to a camera head capable of further size reduction.

Furthermore, the present invention relates to a camera head of a camera device and particularly relates to a technology of improving radiation efficiency of a small-sized camera head.

2. Background of the Invention

A camera device in which a camera head provided with an imaging unit is connected to a camera control unit through a cable has been known. In general, the camera head can be detachably attached to the camera control unit in this type of camera device, and the camera device is also called a head separation type camera. The head separation type camera is used as medical and industrial endoscopic cameras and the like, and in those endoscopic cameras, size reduction of the camera head is extremely important.

In the endoscopic camera, improvement of color reproducibility in a camera image is also important. Particularly, regarding the medical endoscopic camera used for an operation and the like, improvement of color reproducibility in a camera image is extremely important. In those endoscopic cameras, a 3-color separation prism and three image sensors are used in the imaging unit. This type of endoscopic camera is also called a 3-chip type camera.

Japanese Patent Laid-Open No. JP 2002-354300 A discloses such a head separation type camera.

However, effective utilization of a space inside the camera head is not sufficient in the prior-art endoscopic camera, and further size reduction of the camera head has been in demand.

The present invention was made in order to solve the above prior-art problems and has an object to provide a camera head and a camera device that can realize further size reduction.

Furthermore, with a prior-art endoscopic camera, if the size of a camera head is merely reduced, there is a problem that the temperature can easily rise due to heat from electronic components and the like for the portion by which the capacity of the camera head is reduced. Some radiation structure can be provided in the camera head, but a space in the small-sized camera head is not sufficient, and there is a problem that a complicated radiation structure cannot be provided.

The present invention was made in order to solve the above prior-art problems and has an object to improve radiation efficiency of a small-sized camera head.

SUMMARY OF THE INVENTION

A camera head of the present invention includes an imaging unit having three image sensors, a flexible substrate connected to the three image sensors, and a chassis in which the imaging unit is accommodated and on which the flexible substrate is mounted, and the three image sensors are provided on the upper face side, the rear face side, and the lower face side of the imaging unit, respectively. The flexible substrate is configured to be arranged on the transverse face side of the imaging unit on which the image sensor is not provided in the chassis.

The flexible substrate is arranged on the transverse face side of the imaging unit in the chassis by means of this configuration. In this case, the three image sensors of the imaging unit are provided on the upper face side, the rear face side, and the lower face side of the imaging unit, and thus, no image sensor is provided on the transverse face side of the imaging unit. Therefore, there is a room for ensuring a space in the chassis on the transverse face side of the imaging unit. In the present invention, the space (the space on the transverse face side of the imaging unit) is used as a space for mounting the flexible substrate. Therefore, the space in the chassis can be effectively utilized, and the size of the camera head can be reduced for that portion.

Moreover, in the camera head of the present invention, the imaging unit has a configuration in which a prism having the three image sensors provided on the upper face side, the rear face side, and the lower face side, respectively, is provided, a prism base plate for fixing the prism to the chassis is provided on one of the transverse face sides of the prism, and the flexible substrate is arranged on the other transverse face side of the prism on which the prism base plate is not provided.

The flexible substrate is arranged on the other transverse face side of the prism by means of this configuration. The prism base plate is provided on the one transverse face side of the prism, but the prism base plate is not provided on the other transverse face side of the prism. Therefore, there is a room for ensuring a space inside the chassis on the other transverse face side of the prism. In the present invention, the space (the space on the other transverse face side of the prism) is used as a space for mounting the flexible substrate. Therefore, the space in the chassis can be effectively utilized, and the size of the camera head can be reduced for that portion.

Moreover, the camera head of the present invention is provided with a substrate holder on which the flexible substrate is mounted, and the substrate holder is provided with a substrate holding portion which locks and holds the flexible substrate and a locking portion which is locked by a locked portion provided on the chassis, and the flexible substrate has a configuration of being mounted on a side wall of the chassis through the substrate holder.

The flexible substrate is locked and held by the substrate holder by means of this configuration, and the substrate holder is locked by and mounted on the chassis. As a result, the flexible substrate can be mounted on the chassis without using a screw. If the flexible substrate is to be mounted on the chassis by using a screw as in the prior-art device, a space for screwing (a space for providing a screw hole) needs to be ensured in the chassis. On the other hand, in the present invention, a space for screwing does not have to be ensured in the chassis, and the size of the camera head can be reduced for that portion.

Moreover, the camera head of the present invention has a configuration in which the flexible substrate is provided with a first rigid portion on which a first electronic component is mounted and a second rigid portion on which a second electronic component having a heat generation amount larger than that of the first electronic component is mounted, the chassis is provided with a partition wall which divides the inside into a front-side space and a rear-side space, and the imaging unit is accommodated in the front-side space. The first rigid portion is mounted on the side wall on the transverse face side of the imaging unit from the inside in the front-side space, while the second rigid portion is mounted on the partition wall in the rear-side space from the rear side.

The inside of the chassis is divided by the partition wall into the front-side space and the rear-side space, and the second electronic component having a large heat generation amount is arranged in the rear-side space, while the first electronic component with a small heat generation amount and the imaging unit are arranged in the front-side space by means of this configuration. The first electronic component with a small heat generation amount has a guaranteed temperature value lower than the second electronic component with a large heat generation amount. According to the present invention, by arranging the second electronic component with a large heat generation amount in the rear-side space, heat can be radiated efficiently. Moreover, by arranging the first electronic component with a low guaranteed temperature value in a space different from that for the second electronic component with a large heat generation amount (spaces in which the first and second electronic components are arranged are separated from each other), temperature distribution in the chassis can be divided into two stages, and the first electronic component with a low guaranteed temperature value can be prevented from being affected by heat from the second electronic component with a large heat generation amount.

Moreover, the camera head of the present invention has a configuration in which the first rigid portion is mounted on the side wall through a first radiation sheet, while the second rigid portion is mounted on the partition wall through a second radiation sheet.

The heat from the first electronic component is transmitted to the side wall of the chassis through the first radiation sheet by means of this configuration. Moreover, the heat from the second electronic component is transmitted to the partition wall of the chassis through the second radiation sheet. As a result, heat can be radiated from the chassis, and radiation efficiency can be improved.

The camera device of the present invention has a configuration provided with the above-described camera head and a control unit to which the camera head is connected through a cable.

According to this camera device, the space on the transverse face side of the imaging unit can be used as a space for mounting the flexible substrate in the camera head similarly to the above in this camera device as well, and thus, the space in the chassis of the camera head can be effectively utilized, and the size of the camera head can be reduced for that portion.

Furthermore, a camera head of the present invention includes an imaging unit, a flexible substrate connected to the imaging unit, and a chassis in which the imaging unit is accommodated and on which the flexible substrate is mounted, and the flexible substrate is provided with a first rigid portion on which a first electronic component is mounted and a second rigid portion on which a second electronic component having a heat generation amount larger than that of the first electronic component is mounted, the chassis is provided with a partition wall which divides the inside into a front-side space and a rear-side space, and the imaging unit is accommodated in the front-side space. The first rigid portion is mounted on the side wall of the chassis from the inside in the front-side space, while the second rigid portion is mounted on the partition wall from the rear side in the rear-side space.

The inside of the chassis is divided by the partition wall into the front-side space and the rear-side space, and the second electronic component having a large heat generation amount is arranged in the rear-side space, while the first electronic component with a small heat generation amount and the imaging unit are arranged in the front-side space by means of this configuration. The first electronic component with a small heat generation amount has a guaranteed temperature value lower than the second electronic component with a large heat generation amount. According to the present invention, by arranging the second electronic component with a large heat generation amount in the rear-side space, heat can be radiated efficiently. Moreover, by arranging the first electronic component with a low guaranteed temperature value in a space different from that for the second electronic component with a large heat generation amount (spaces in which the first and second electronic components are arranged are separated from each other), temperature distribution in the chassis can be divided into two stages, and the first electronic component with a low guaranteed temperature value can be prevented from being affected by heat from the second electronic component with a large heat generation amount.

Moreover, the camera head of the present invention has a configuration in which the first rigid portion is mounted on the side wall through a first radiation sheet, while the second rigid portion is mounted on the partition wall through a second radiation sheet.

The heat from the first electronic component is transmitted to the side wall of the chassis through the first radiation sheet by means of this configuration. Moreover, the heat from the second electronic component is transmitted to the partition wall of the chassis through the second radiation sheet. As a result, heat can be radiated from the chassis, and radiation efficiency can be improved.

Moreover, in the camera head of the present invention, the imaging unit is provided with three image sensors, and the three image sensors are provided on the upper face side, the rear face side, and the lower face side of the imaging unit, respectively. The flexible substrate is configured to be mounted on the side wall of the chassis from the inside on the transverse face side of the imaging unit on which the image sensor is not provided.

The flexible substrate is mounted on the side wall of the chassis from the inside of on the transverse face side of the imaging unit by means of this configuration. In this case, the three image sensors of the imaging unit are provided on the upper face side, the rear face side, and the lower face side of the imaging unit, and thus, no image sensor is provided on the transverse face side of the imaging unit. Therefore, there is a room for ensuring a space in the chassis on the transverse face side of the imaging unit. In the present invention, the space (the space on the transverse face side of the imaging unit) is used as a space for mounting the flexible substrate. Therefore, the space in the chassis can be effectively utilized, and the size of the camera head can be reduced for that portion.

Moreover, the camera head of the present invention is provided with a substrate holder on which the flexible substrate is mounted, and the substrate holder is provided with a substrate holding portion which locks and holds the flexible substrate and a locking portion which is locked by a locked portion provided on the chassis, and the flexible substrate has a configuration of being mounted on a side wall of the chassis through the substrate holder.

The flexible substrate is locked and held by the substrate holder by means of this configuration, and the substrate holder is locked by and mounted on the chassis. As a result, the flexible substrate can be mounted on the chassis without using a screw. If the flexible substrate is to be mounted on the chassis by using a screw as in the prior-art device, a space for screwing (a space for providing a screw hole) needs to be ensured in the chassis. On the other hand, in the present invention, a space for screwing does not have to be ensured in the chassis, and the size of the camera head can be reduced for that portion.

The camera device of the present invention has a configuration provided with the above-described camera head and a control unit to which the camera head is connected through a cable.

According to this camera device, too, by arranging the second electronic component with a large heat generation amount in the rear-side space, heat can be radiated efficiently. Moreover, by setting temperature distribution in the chassis into two stages, the first electronic component with a low guaranteed temperature value can be prevented from being affected by heat from the second electronic component with a large heat generation amount.

The present invention can provide a camera head and a camera device having an advantage that further size reduction can be realized.

Furthermore, the present invention can provide a camera head and a camera device having an advantage that radiation efficiency can be improved even in the small-sized camera.

DETAILED DESCRIPTION OF THE PREFERRED EMBODIMENTS

A camera head and a camera device of an embodiment of the present invention will be described below by using the attached drawings. In this embodiment, a camera device used as a medical endoscopic camera (a laparoscopy for observing inside an abdominal cavity and the like, for example) will be exemplified.

Figure 3:
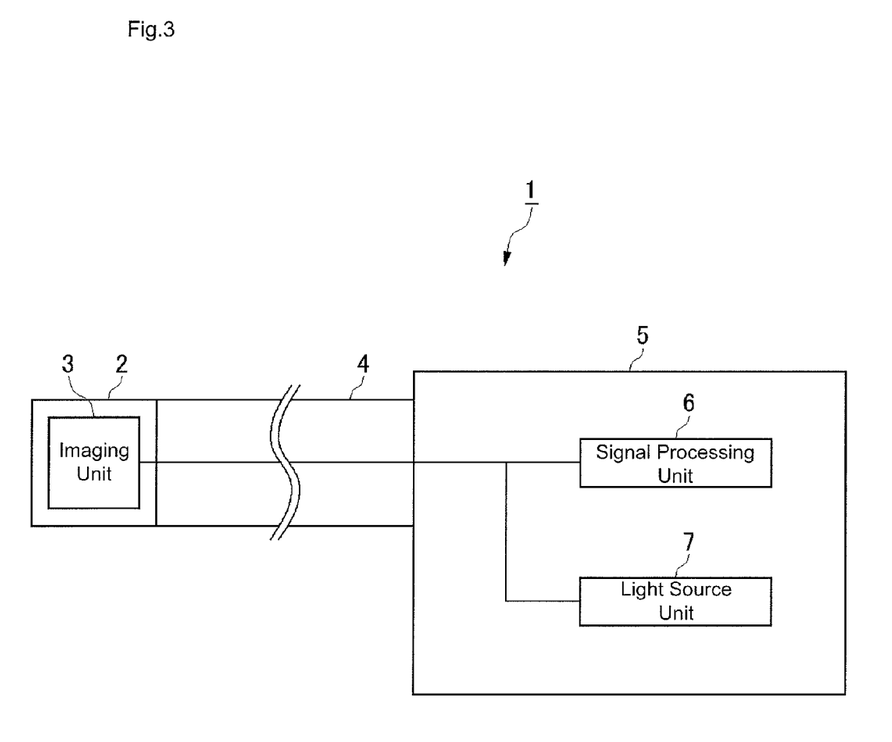
FIG. 3 is a block diagram for explaining a configuration of a camera device in the embodiment of the present invention.

A configuration of the camera device of the embodiment of the present invention will be described by referring to the attached drawings. Here, the entire configuration of the camera device will be described, first, by referring to FIG. 3. As illustrated in FIG. 3, a camera device 1 is provided with a camera head 3 provided with an imaging unit 2 and a control unit 5 on which the camera head 3 is detachably mounted through a cable 4. The control unit 5 is provided with a signal processing unit 6, a light source unit 7 and the like. The signal processing unit 6 has a function of applying predetermined signal processing to an image input signal obtained from the imaging unit 2 and of generating an image output signal to be outputted to a monitor (not shown) or the like. The light source unit 7 has a function of sending light for illumination to the camera head 3 by using an optical fiber (not shown) or the like.

Figure 1:
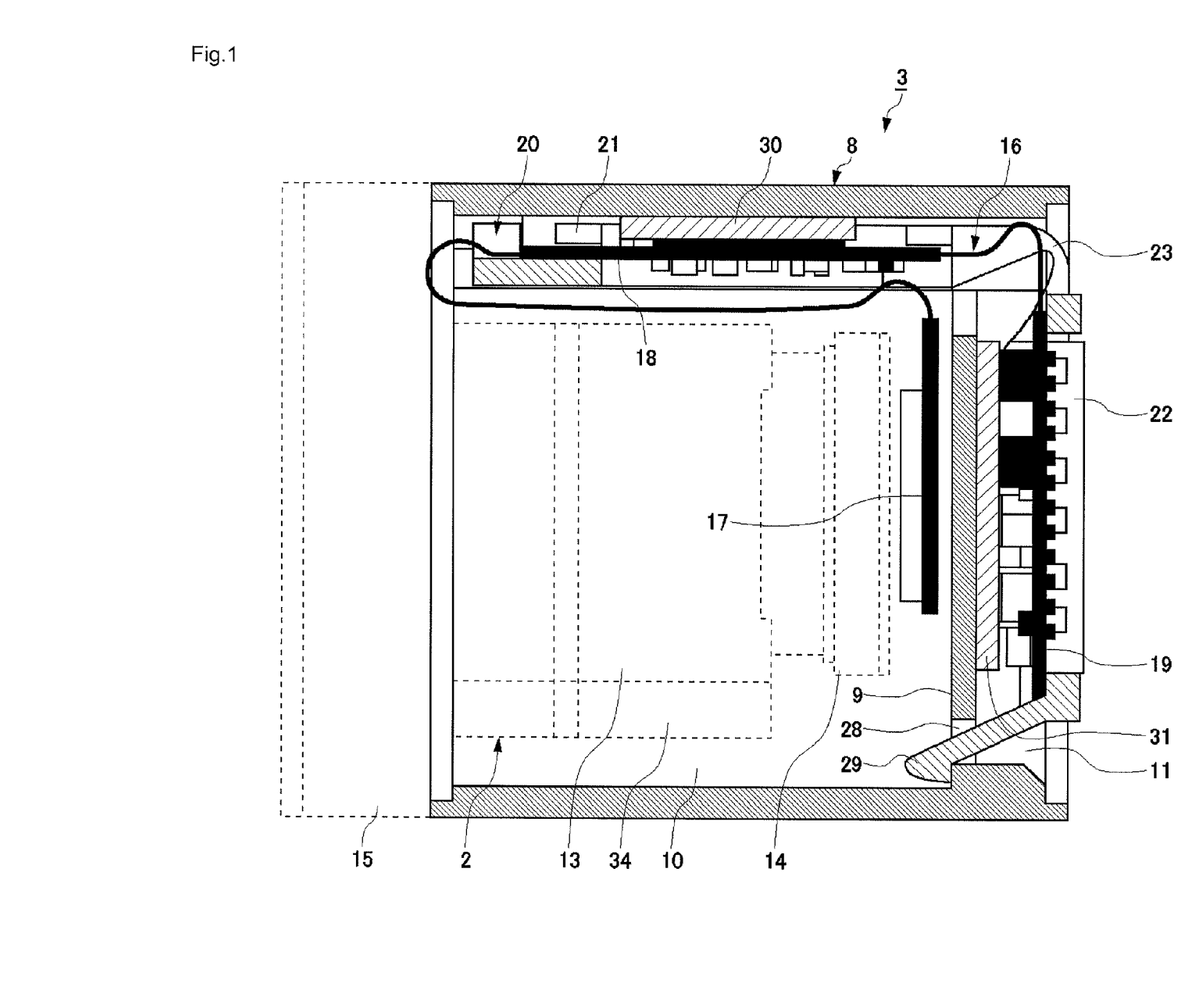
FIG. 1 is a plan view for explaining a configuration of a camera head in an embodiment of the present invention.
Figure 2:
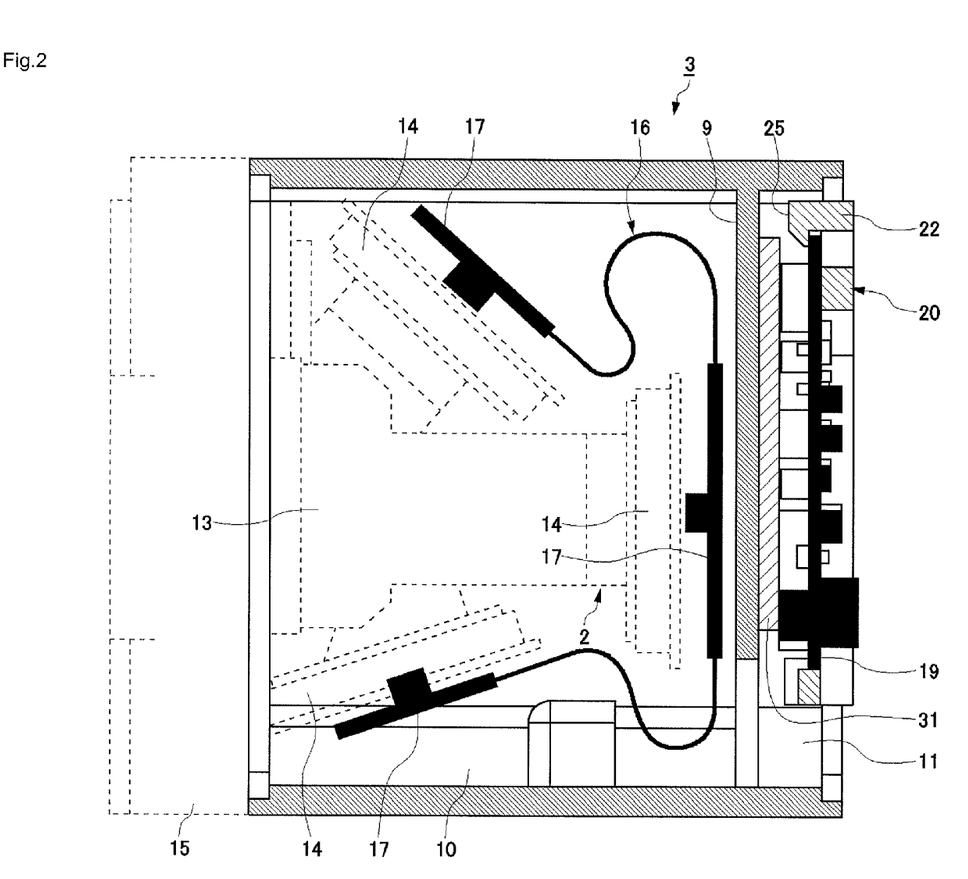
FIG. 2 is a side view for explaining the configuration of the camera head in the embodiment of the present invention.
Figure 4:
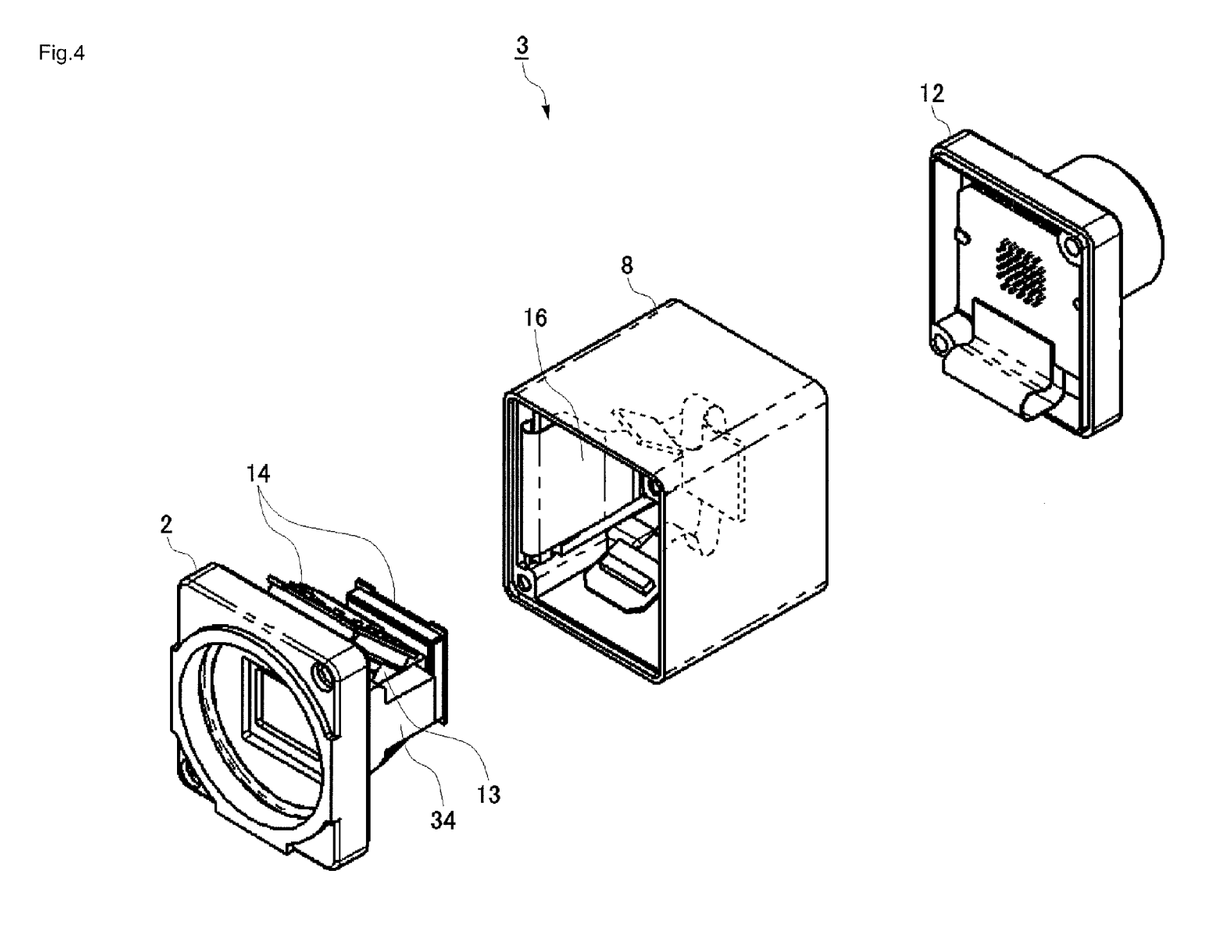
FIG. 4 is an exploded perspective view for explaining the configuration of the camera head in the embodiment of the present invention.

Subsequently, the configuration of the camera head 3 will be described in detail by referring to FIGS. 1 to 12. As illustrated in FIG. 4, a chassis 8 of the camera head 3 is composed of upper and lower and right and left four side walls and has a cylindrical shape opened in the longitudinal direction (a cylindrical shape having a substantially square section). As illustrated in FIGS. 1 and 2, a partition wall 9 is provided in this chassis 8, and the inside of the chassis 8 is divided into two spaces (a front-side space 10 and a rear-side space 11) by this partition wall 9. Here, the left side in FIG. 1 is the "front", while the right side in FIG. 1 is the "rear". Also, the upper side and the lower side in FIG. 1 are the "transverse". Also, the upper side in FIG. 2 is the "upper" and the lower side in FIG. 2 is the "lower". Also, a case in which the shape of the chassis 8 is a square cylinder having a substantially square section will be described here, but the shape of the chassis 8 is not limited to that and may be a cylindrical shape having a substantially circular section.

As illustrated in FIG. 4, the imaging unit 2 is mounted on this chassis 8 from the front side, and a connector unit 12 is mounted from the rear side. The imaging unit 2 is configured to take a camera image and is provided with a 3-color separation prism 13 which separates incident light to three colors (red, green, and blue) and three image sensors 14 which receive the three colors, respectively (See FIG. 2). The imaging unit 2 is also provided with a lens mount 15 on which an optical lens (not shown) is mounted. As illustrated in FIGS. 1 and 2, the imaging unit 2 (the 3-color separation prism 13 and the three image sensors 14) is accommodated in the front-side space 10 of the chassis 8.

As illustrated in FIG. 1, the 3-color separation prism 13 is fixed to the inside of the chassis 8 by using a prism base plate 34. In this case, the prism base plate 34 is fixed to one of the transverse face sides (the lower side in FIG. 1) of the 3-color separation prism 13 by using an adhesive or the like. The prism base plate 34 is fixed to the lens mount 15 by screwing or the like, and the lens mount 15 is fixed to the chassis 8 by screwing and the like. In this case, as illustrated in FIG. 1, the prism base plate 34 is not provided on the other transverse face side (the upper side in FIG. 1) of the 3-color separation prism 13. In this embodiment, a flexible substrate 16 which obtains the image input signal from each of the image sensors 14 is arranged in a space (a space in the chassis 8) on the other transverse face side (the upper side in FIG. 1) of this 3-color separation prism 13.

Each of these image sensors 14 is composed of a MOS sensor, a CCD sensor or the like, for example. In this case, as illustrated in FIG. 2, the image sensor 14 for blue is provided on the upper face side (the upper side in FIG. 2) of the 3-color separation prism 13. The image sensor 14 for green is provided on the rear face side (the right side in FIG. 2) of the 3-color separation prism 13. The image sensor 14 for red is provided on the lower face side (the lower side in FIG. 2) of the 3-color separation prism 13. On the other hand, as illustrated in FIG. 1, the image sensor 14 is not provided on the transverse face sides (the upper side and the lower side in FIG. 1) of the 3-color separation prism 13. In this embodiment, the flexible substrate 16 which obtains the image input signal from each of the image sensors 14 is arranged in the space (the space in the chassis 8) on the transverse face side (the upper side in FIG. 1) of this 3-color separation prism 13.

Figure 5:
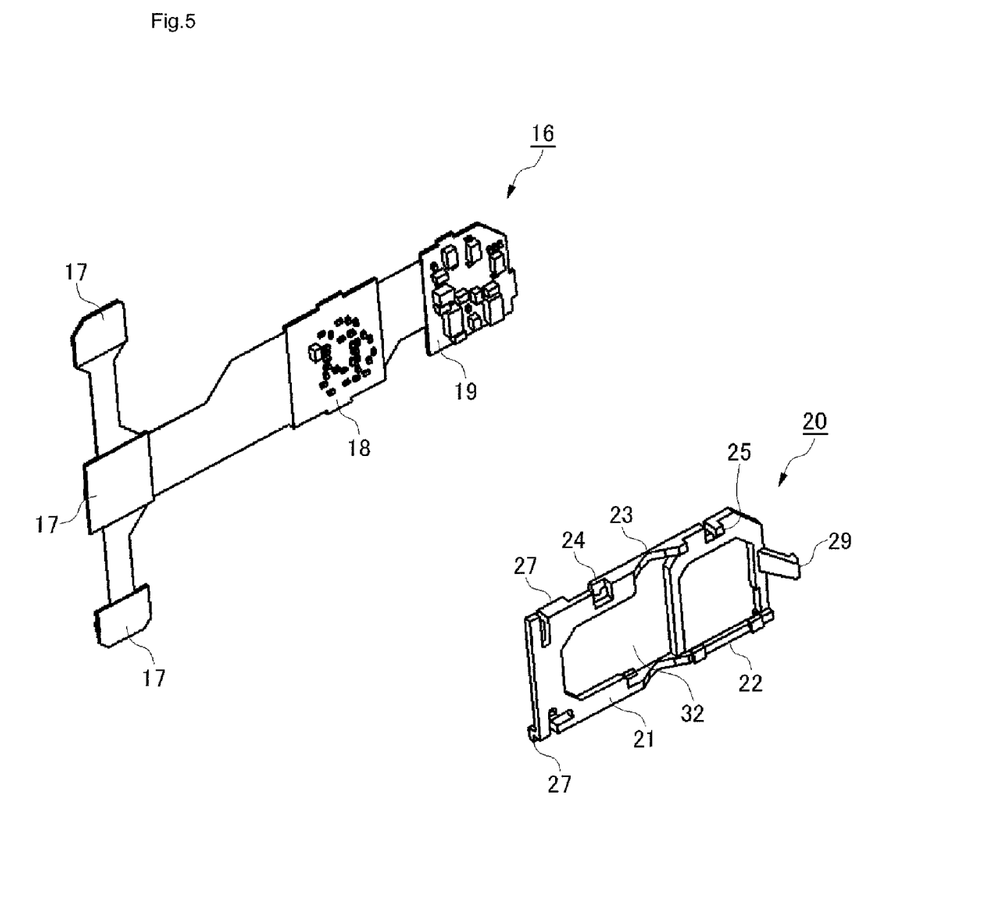
FIG. 5 is a perspective view for explaining configurations of a flexible substrate and a substrate holder.

Here, a configuration of the flexible substrate 16 will be described in detail. As illustrated in FIG. 5, the flexible substrate 16 is provided with three sensor connection portions 17 connected to each of the three image sensors 14. Each of the sensor connection portions 17 is composed of a rigid portion (a portion with high rigidity in the flexible substrate 16).

Moreover, the flexible substrate 16 is provided with a first rigid portion 18 on which an electronic component with a small heat generation amount is mounted and a second rigid portion 19 on which an electronic component with a large heat generation amount is mounted. The adjacent rigid portions are connected through a flexible portion (a portion with high flexibility in the flexible substrate 16).

The flexible substrate 16 is held by a substrate holder 20. As illustrated in FIG. 5, the substrate holder 20 is provided with a first holder portion 21 which holds the first rigid portion 18, a second holder portion 22 which holds the second rigid portion 19, and a connection portion 23 which connects the first holder portion 21 and the second holder portion 22 to each other. The connection portion 23 is formed thin so that it can be bent at an arbitrary angle (90 degrees, for example). That is, freedom in arrangement of the first holder portion 21 and the second holder portion 22 (that is, arrangement of the first rigid portion 18 and the second rigid portion 19) becomes high by making the connection portion 23 thin. A first substrate holding claw 24 which locks and holds an edge portion of the first rigid portion 18 is provided on an edge portion of the first holder portion 21. A second substrate holding claw 25 which locks and holds an edge portion of the second rigid portion 19 is provided on an edge portion of the second holder portion 22. The first substrate holding claw 24 and the second substrate holding claw 25 correspond to substrate holding portions of the present invention.

The flexible substrate 16 is mounted on the chassis 8 while being held by the substrate holder 20. In this case, a locking groove 26 is provided in the edge portion on the side wall of the chassis 8 on the one transverse face side (the upper side in FIG. 1) of the color separation prism in the front-side space 10 of the chassis 8 (See FIG. 9), and a locking piece 27 provided on the edge portion of the first holder portion 21 is locked by this locking groove 26 (See FIGS. 11 and 12). The first rigid portion is mounted on the side wall of the chassis 8 on the transverse face side of the color separation prism while being held by the first holder portion 21. On the other hand, a locking hole 28 is provided in the edge portion of the partition wall 9 of the chassis 8 on the other transverse face side (the lower side in FIG. 1) of the color separation prism in the rear-side space 11 of the chassis 8 (See FIG. 10), and a locking claw 29 installed upright from the edge portion of the second holder is locked by this locking hole 28 (See FIG. 1). Here, the locking groove 26 and the locking hole 28 correspond to locked portions of the present invention, and the locking piece 27 and the locking claw 29 correspond to the locking portion of the present invention.

Figure 9:
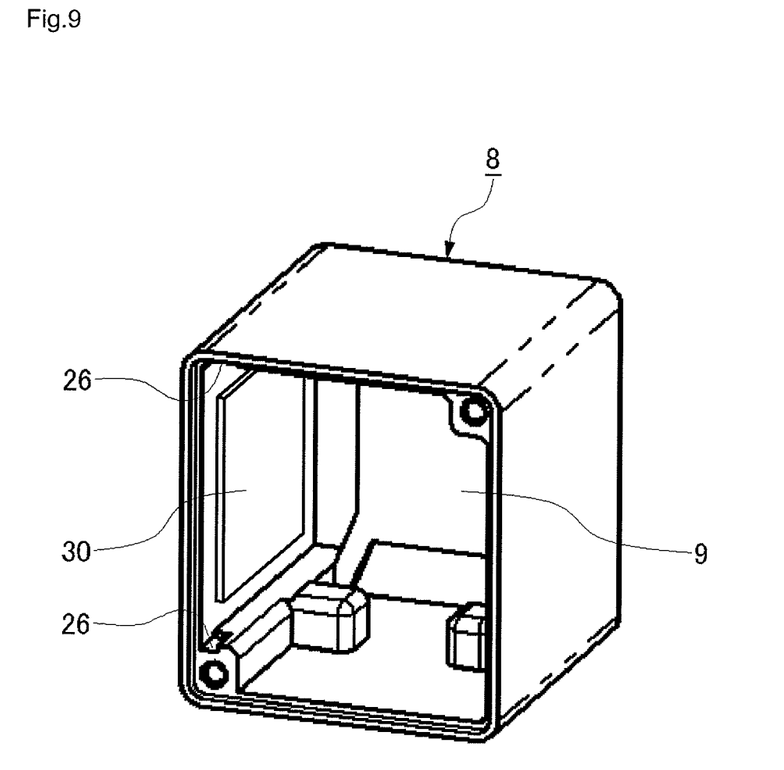
FIG. 9 is a perspective view of a chassis of the camera head when seen from the front side.

As illustrated in FIG. 9, a first radiation sheet 30 is mounted on the side wall of the chassis 8 on the transverse face side of the color separation prism in the front-side space 10 of the chassis 8. The first rigid portion is mounted on the side wall of the chassis 8 from the inside through this first radiation sheet 30. That is, the first radiation sheet 30 is interposed between the electronic component of the first rigid portion and the side wall of the chassis 8, and the electronic component of the first rigid portion 18 is pressed onto the first radiation sheet 30. The first radiation sheet 30 has viscosity, and the first radiation sheet is bonded to the side wall of the chassis 8 using the viscosity. Moreover, the first radiation sheet 30 has elasticity (cushioning properties), and rattling when the first rigid portion is mounted is suppressed by the elasticity.

Figure 10:
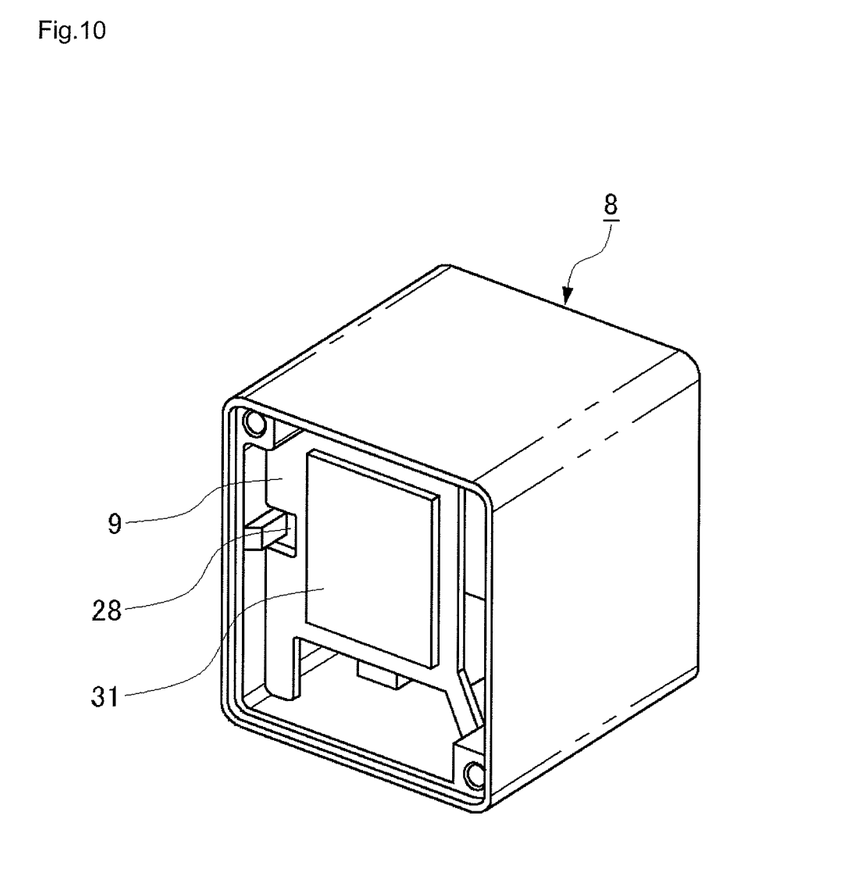
FIG. 10 is a perspective view of the chassis of the camera head when seen from the rear side.

On the other hand, as illustrated in FIG. 10, a second radiation sheet 31 is mounted on the partition wall 9 of the chassis 8 in the rear-side space 11 of the chassis 8. The second rigid portion is mounted on the partition wall 9 of the chassis 8 from the rear side through the second radiation sheet 31.

That is, the second radiation sheet 31 is interposed between the electronic component of the second rigid portion and the partition wall 9 of the chassis 8, and the electronic component of the second rigid portion 19 is pressed onto the second radiation sheet 31. The second radiation sheet 31 has viscosity, and the second radiation sheet is bonded to the partition wall 9 of the chassis 8 by using the viscosity. Moreover, the second radiation sheet 31 has elasticity (cushioning properties), and rattling when the second rigid portion is mounted is suppressed by the elasticity.

Regarding the camera head 3 constituted as above, its assembling process will be described by referring to the drawings.

Figure 6:
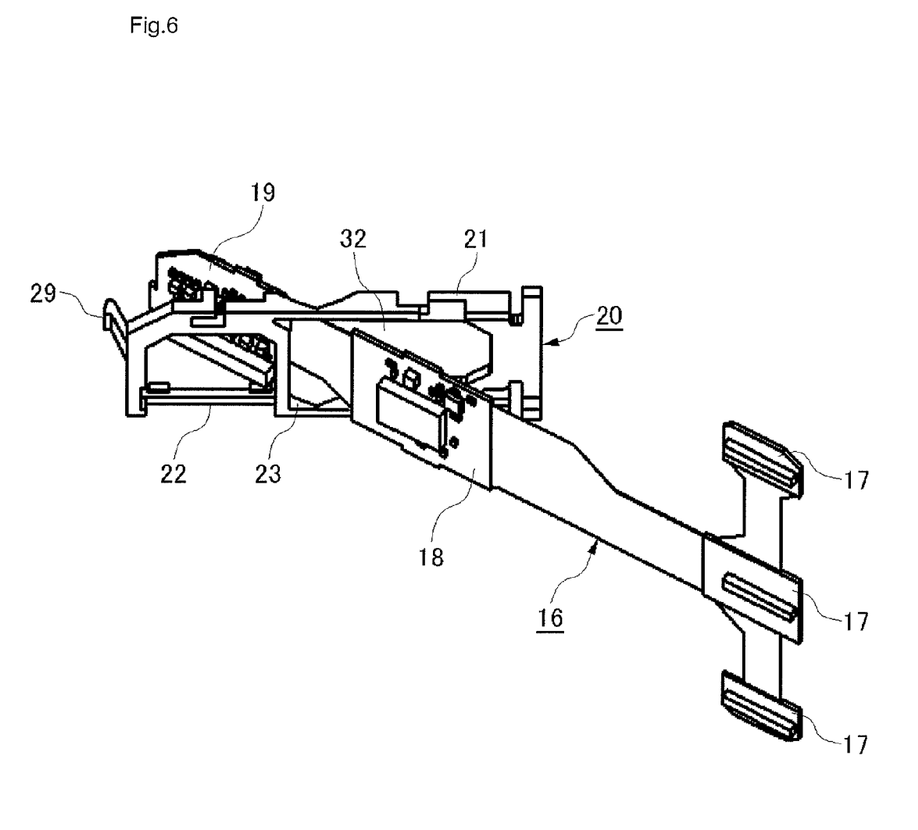
FIG. 6 is a perspective view for explaining holding of the flexible substrate by the substrate holder.
Figure 7:
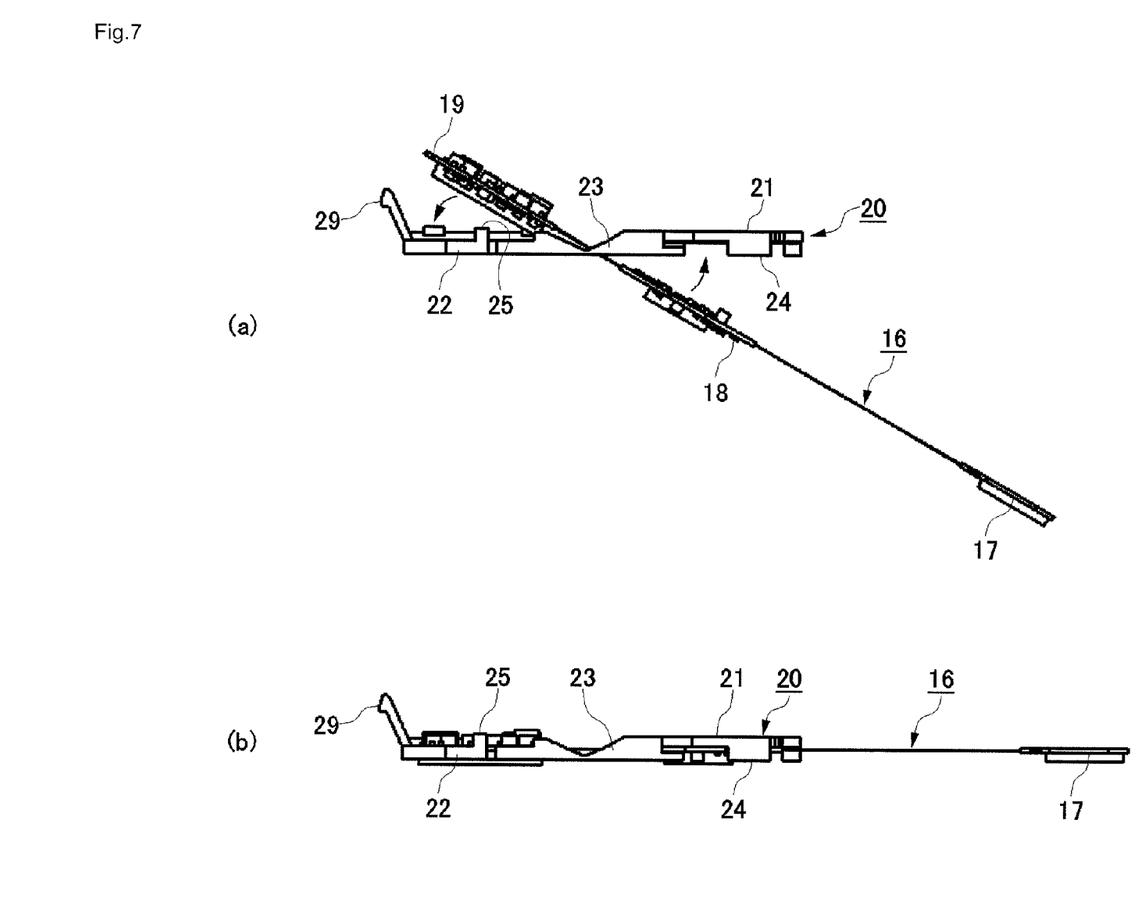
FIG. 7 is a side view for explaining holding of the flexible substrate by the substrate holder.
Figure 8:
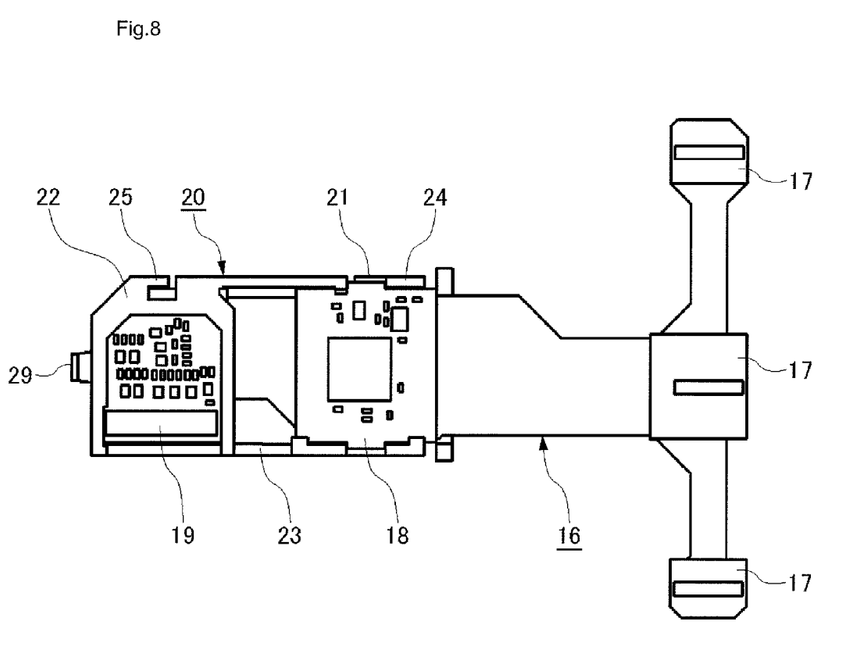
FIG. 8 is a plan view of the flexible substrate held by the substrate holder.

When the camera head 3 in this embodiment is to be assembled, first, the substrate holder 20 is mounted on the flexible substrate 16. In this case, as illustrated in FIG. 6, the second rigid portion 19 of the flexible substrate 16 is inserted through an opening portion 32 at the center of the first holder portion 21 of the substrate holder 20, and the second rigid portion is arranged on the back side (the upper side in FIG. 7) of the second holder portion 22. At this time, the first rigid portion is arranged on the front side (the lower side in FIG. 7) of the first holder portion 21. Then, as illustrated in FIG. 7, the edge portion of the second rigid portion 19 is locked and held by the second substrate holding claw 25 (protruding toward the back side) of the second holder portion 22, and the edge portion of the first rigid portion 19 is locked and held by the first substrate holding claw 24 (protruding toward the front side) of the first holder portion 21. As described above, the mounting of the substrate holder 20 to the flexible substrate 16 is completed (See FIG. 8).

Figure 11:
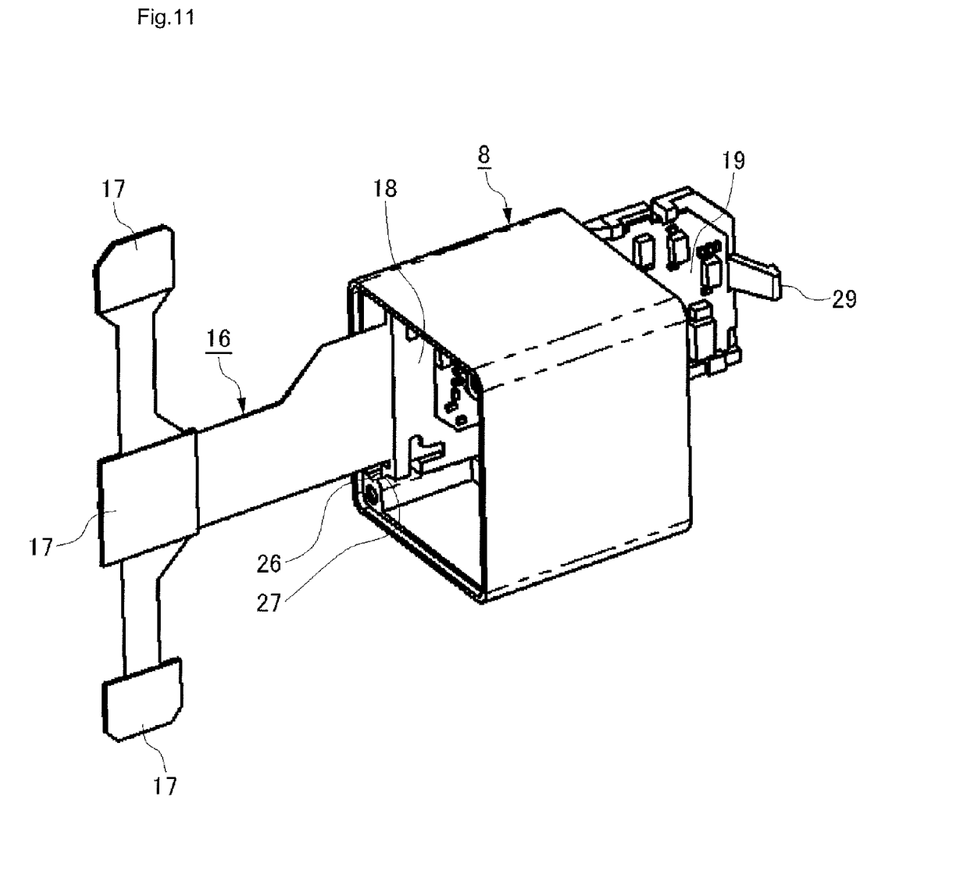
FIG. 11 is a perspective view illustrating a state in which the substrate holder is to be mounted on the chassis of the camera head.
Figure 12:
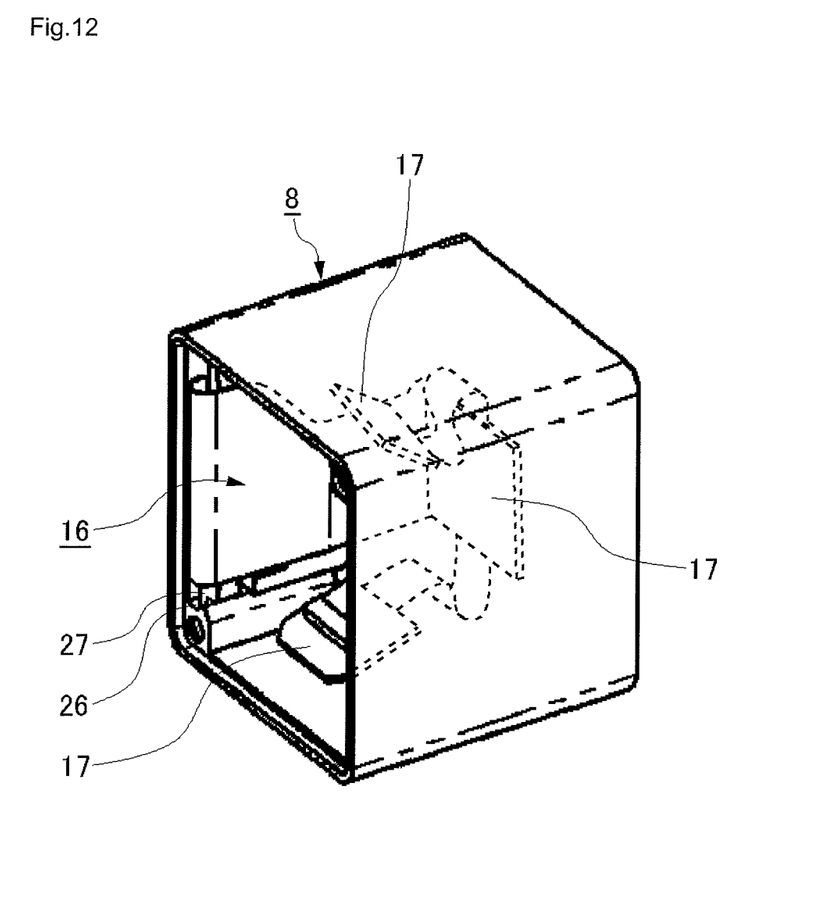
FIG. 12 is a perspective view illustrating a state in which the substrate holder has been mounted on the chassis of the camera head.

Subsequently, the flexible substrate 16 (the flexible substrate 16 held by the substrate holder 20) is mounted on the chassis 8. In this case, as illustrated in FIG. 11, first, the locking piece 27 of the first holder portion 21 is inserted into and locked by the locking groove 26 in the side wall of the chassis 8. After that, the flexible substrate 16 is bent at the connection portion 23, and the locking claw 29 of the second holder portion 22 is inserted into and locked by the locking hole 28 of the partition wall 9 of the chassis 8 (See FIG. 1). Then, the three sensor connection portions 17 are connected to the three image sensors 14, respectively, and then, the imaging unit 2 is assembled from the front side of the chassis 8. Moreover, the connector unit 12 is assembled from the rear side of the chassis 8. The assembly of the camera head 3 is completed as above.

In the camera device 1 of such embodiment, the size of the camera head 3 can be further reduced.

That is, in this embodiment, the flexible substrate 16 is mounted on the side wall of the chassis 8 on the transverse face side of the imaging unit 2 from the inside. In this case, the three image sensors 14 of the imaging unit 2 are provided on the upper face side, the rear face side, and the lower face side of the imaging unit 2, and thus, the image sensor 14 is not provided on the transverse face side of the imaging unit 2. Therefore, there is a room for ensuring a space in the chassis 8 on the transverse face side of the imaging unit 2. In this embodiment, the space (the space on the transverse face side of the imaging unit 2) is used as a space for mounting the flexible substrate 16. Therefore, the space in the chassis 8 can be effectively utilized, and the size of the camera head 3 can be reduced for that portion.

In this case, the flexible substrate 16 is arranged on the other transverse face side of the 3-color separation prism 13. As illustrated in FIG. 1, the prism base plate 34 is provided on the one transverse face side (the lower side in FIG. 1) of the 3-color separation prism 13, but the prism base plate 34 is not provided on the other transverse face side (the upper side in FIG. 1) of the 3-color separation prism 13. Therefore, there is a room for ensuring space in the chassis 8 on the other transverse face side of the 3-color separation prism 13. In this embodiment, the space (the space on the other transverse face side of the 3-color separation prism 13) is used as a space for mounting the flexible substrate 16. Therefore, the space in the chassis 8 can be effectively utilized, and the size of the camera head 3 can be reduced for that portion.

Moreover, in this embodiment, the flexible substrate 16 is locked and held by the substrate holder 20, and the substrate holder 20 is locked by and mounted on the chassis 8. As a result, the flexible substrate 16 can be mounted on the chassis 8 without using a screw. If the flexible substrate 16 is to be mounted on the chassis 8 by using a screw as in the prior-art device, a space for screwing (a space for providing a screw hole) needs to be ensured in the chassis 8. On the other hand, in this embodiment, a space for screwing does not have to be ensured in the chassis 8, and the size of the camera head 3 can be reduced for that portion.

Moreover, in this embodiment, the inside of the chassis 8 is divided by the partition wall 9 into the front-side space 10 and the rear-side space 11, in which the second electronic component with a large heat generation amount is arranged in the rear-side space 11, while the first electronic component with a small heat generation amount is arranged in the front-side space 10. The first electronic component with a small heat generation amount has a guaranteed temperature value lower than the second electronic component with a large heat generation amount. According to this embodiment, by arranging the second electronic component with a large heat generation amount in the rear-side space 11, heat can be radiated efficiently. Moreover, by arranging the first electronic component with a low guaranteed temperature value in a space different from that for the second electronic component with a large heat generation amount (spaces to arrange the first and second electronic components are separated from each other), temperature distribution in the chassis 8 can be divided into two stages, and the first electronic component with a low guaranteed temperature value can be prevented from being affected by heat from the second electronic component with a large heat generation amount.

Moreover, in this embodiment, the heat from the first electronic component is transmitted to the chassis 8 (the partition wall 9) through the first radiation sheet 30. Also, the heat from the second electronic component is transmitted to the chassis 8 (side wall) through the second radiation sheet 31. As a result, heat can be radiated from the chassis 8, and radiation efficiency can be improved.

Furthermore, according to the camera device 1 in this embodiment, even if the camera head 3 is small-sized, radiation efficiency of the camera head 3 can be improved.

That is, in this embodiment, the inside of the chassis 8 is divided into the front-side space 10 and the rear-side space 11 by the partition wall 9, the second electronic component with a large heat generation amount such as a power supply portion and the like is arranged in the rear-side space 11, while the first electronic component with a small heat generation amount and the imaging unit 2 are arranged in the front-side space 10. The first electronic component with a small heat generation amount has a guaranteed temperature value lower than the second electronic component with a large heat generation amount. According to this embodiment, by arranging the second electronic component with a large heat generation amount in the rear-side space 11, heat can be radiated efficiently. Moreover, by arranging the first electronic component with a low guaranteed temperature value in a space different from that for the second electronic component with a large heat generation amount (spaces to arrange the first and second electronic components are separated from each other), temperature distribution in the chassis 8 can be divided into two stages, and the first electronic component with a low guaranteed temperature value can be prevented from being affected by heat from the second electronic component with a large heat generation amount.

Moreover, in this embodiment, the heat from the first electronic component is transmitted to the chassis 8 (the partition wall 9) through the first radiation sheet 30. Also, the heat from the second electronic component is transmitted to the chassis 8 (side wall) through the second radiation sheet 31. As a result, heat can be radiated from the chassis 8, and radiation efficiency can be improved.

The embodiment of the present invention has been described by exemplification, but the scope of the present invention is not limited to them but can be changed/deformed in accordance with the purpose within a range described in the claims.

Figure 13:
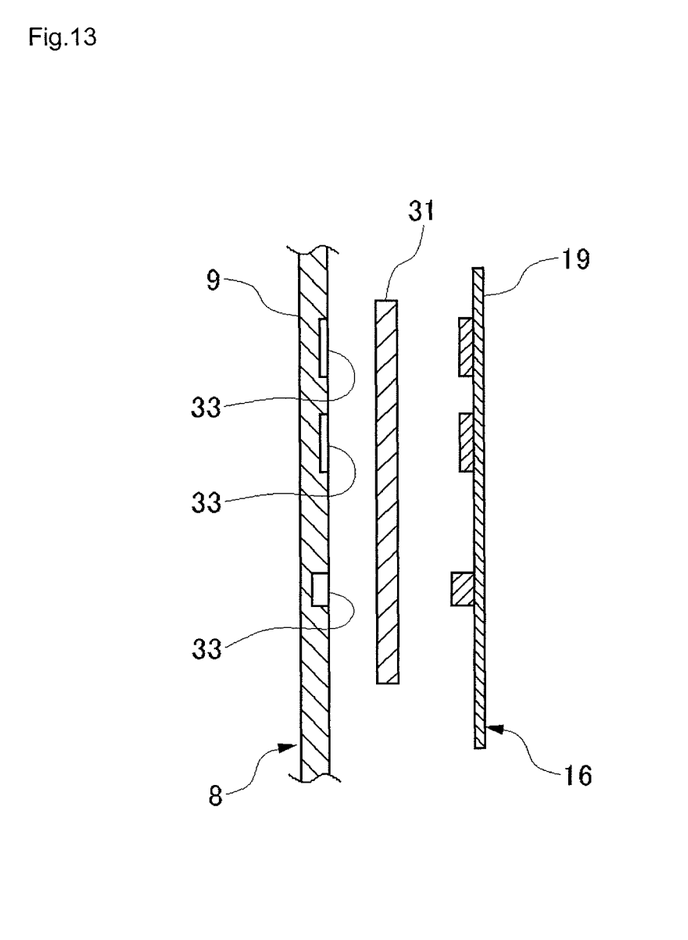
FIG. 13 is an explanatory diagram of a recess portion of a partition wall of the chassis of the camera head.

For example, a recess portion 33 corresponding to the projecting shape of the electronic component may be formed in the side wall of the chassis 8 or the partition wall 9 on which the radiation sheet (the first radiation sheet 30 or the second radiation sheet 31) is mounted as illustrated in FIG. 13. By forming such recess portion 33, a reaction force from the radiation sheets 30 and 31 when the electronic component is pressed on the radiation sheets 30 and 31 can be made uniform.

Moreover, in this embodiment of the present invention, the second electronic component with a large heat generation amount is arranged in the rear-side space 11 and the first electronic component with a small heat generation amount is arranged in the front-side space 10, but to the contrary, it may be so configured that the first electronic component with a small heat generation amount is arranged in the rear-side space 11 and the second electronic component with a large heat generation amount is arranged in the front-side space 10.

As described above, the camera head according to the present invention has an advantage that further size reduction is possible and is useful in application to medical and industrial endoscopic cameras and the like.

As described above, the camera head according to the present invention has an advantage that radiation efficiency can be improved even if the camera head is small-sized and is useful in application to medical and industrial endoscopic cameras and the like.

The invention claimed is:

1. A camera head comprising:
an imager having three image sensors;
a flexible substrate connected to said three image sensors; and
a chassis in which said imager is accommodated and on which said flexible substrate is mounted, wherein
said three image sensors are provided on an upper face side, a rear face side, and a lower face side of said imager, respectively, and
said flexible substrate is provided with a first rigid portion on which a first electronic component is mounted and a second rigid portion on which a second electronic component having a heat generation amount larger than that of said first electronic component is mounted;
said chassis is provided with a partition wall which divides an inside of said chassis into a front-side space and a rear-side space;
said imager is accommodated in said front-side space;

said first rigid portion is mounted on a said side wall of said chassis on a transverse face side of said imager in said front-side space; and said second rigid portion is mounted on said partition wall in said rear-side space.

2. The camera head according to claim 1, wherein said imager has a prism in which said three image sensors are provided on an upper face side, a rear face side, and a lower face side, respectively;

a prism base plate for fixing said prism to said chassis is provided on one of transverse face sides of said prism; and said flexible substrate is arranged on an other transverse face side of said prism on which said prism base plate is not provided.

3. The camera head according to claim 1, further comprising:

a substrate holder on which said flexible substrate is mounted, wherein said substrate holder is provided with a substrate holding portion which locks and holds said flexible substrate and a locking portion which is locked by a locked portion provided on said chassis; and said flexible substrate is mounted on said side wall of said chassis through said substrate holder.

4. The camera head according to claim 1, wherein said first rigid portion is mounted on said side wall through a first radiation sheet; and said second rigid portion is mounted on said partition wall through a second radiation sheet.

5. A camera device comprising:

the camera head according to claims 1; and a controller to which said camera head is connected through a cable.

* * * * *